(12) United States Patent
Björk et al.

(10) Patent No.: US 12,007,676 B2
(45) Date of Patent: Jun. 11, 2024

(54) ASSEMBLY AND CAMERA DEVICE

(71) Applicant: Axis AB, Lund (SE)

(72) Inventors: Ola Björk, Lund (SE); Malte Bokvist, Lund (SE); Magnus Ainetoft, Lund (SE)

(73) Assignee: Axis AB, Lund (SE)

(*) Notice: Subject to any disclaimer, the term of this patent is extended or adjusted under 35 U.S.C. 154(b) by 76 days.

(21) Appl. No.: 17/835,038

(22) Filed: Jun. 8, 2022

(65) Prior Publication Data

US 2023/0116316 A1 Apr. 13, 2023

(30) Foreign Application Priority Data

Oct. 11, 2021 (EP) ..................................... 21201970

(51) Int. Cl.
*G03B 17/56* (2021.01)
*F16M 13/02* (2006.01)

(52) U.S. Cl.
CPC ........... *G03B 17/561* (2013.01); *F16M 13/02* (2013.01)

(58) Field of Classification Search
CPC ............................... G03B 17/561; F16M 13/02
See application file for complete search history.

(56) References Cited

U.S. PATENT DOCUMENTS

| | | | |
|---|---|---|---|
| 4,373,826 A * | 2/1983 | Inamoto | ................. B60R 19/52 24/581.1 |
| 5,775,831 A | 7/1998 | Mullenberg | |
| 10,674,048 B2 | 6/2020 | Guan et al. | |
| 2010/0272427 A1 | 10/2010 | Jung et al. | |
| 2013/0322985 A1 | 12/2013 | Gasmen et al. | |
| 2018/0009392 A1 | 1/2018 | Yokota et al. | |

FOREIGN PATENT DOCUMENTS

| | | |
|---|---|---|
| EP | 1444912 A1 | 8/2004 |
| JP | 2008-092258 A | 4/2008 |
| WO | 2010/092766 A1 | 8/2010 |

* cited by examiner

*Primary Examiner* — Minh Q Phan
(74) *Attorney, Agent, or Firm* — Volpe Koenig

(57) ABSTRACT

A camera device comprises an assembly having a first component and a second component which are connected to each other with a hollow holding member and a threaded fastener. The first component has a first socket with a first socket opening and a threaded bore extending from a bottom surface of the first socket. The second component has a second socket with a second socket opening, wherein the first socket opening and the second socket opening are configured to face each other when the first and second component are connected to each other. The first and second sockets each have threaded bores. A threaded fastener is configured to extend from the second component to the threaded bore of the first socket of the first component for engagement with the threaded bore such that the connection between the first and second components is secured.

17 Claims, 6 Drawing Sheets

ASSEMBLY AND CAMERA DEVICE

FIELD OF INVENTION

The present disclosure relates to an assembly and a camera device comprising such an assembly. More specifically, the disclosure relates to an assembly comprising a first component and a second component connected thereto.

TECHNICAL BACKGROUND

A device may comprise an assembly comprising a first and second component connectible to each other. The first component may be configured for mounting on a surface. In may often be beneficial for the assembly to comprise means for temporarily holding the first and second component together in order to facilitate different steps of the installation, such as attaching of wirings. It is known to use different types of clips as means for temporarily holding the first and second component together. The installation may then be finished by securing the first and second component in an assembled state by means of threaded fasteners.

The device comprising an assembly as described above may be a camera device, such as a surveillance camera.

Surveillance cameras are commonly used to monitor objects or people within an area of surveillance by producing streams of video images that may be displayed to and/or recorded for use by security personnel. To obtain a clear view of the area of surveillance, the surveillance cameras are often mounted many meters off the ground, to a wall, to a post structure or to a ceiling structure. This complicates the installation procedure for an installer of the surveillance camera. To this end, the installation personnel may need a scaffold or a ladder further complicating the handling of the surveillance camera. Thus, there is a need for surveillance cameras that are simple to install.

SUMMARY

It is an object of the present disclosure to provide an assembly comprising a first component and a second component connectable thereto, which assembly facilitates installation.

To achieve the above object and also other objects that will be evident from the following description, an assembly having the features defined in claim 1 is provided according to the present disclosure. Preferred embodiments will be evident from the dependent claims.

More specifically, there is provided according to a first aspect of the present disclosure an assembly comprising a first component, a second component, a hollow holding member and a threaded fastener. The first component is connectable to the second component by means of the holding member and the threaded fastener. The first component has a first socket with a first socket opening and a threaded bore extending from a bottom surface of the first socket, and the second component has a second socket with a second socket opening. The first socket opening and the second socket opening are configured to face each other when the first and second component are connected to each other, wherein one of the first socket and the second socket is provided with an inlet restriction. The hollow holding member comprises a first portion arranged in the other one of the first socket and the second socket and connected to the associated first or second component. The hollow holding member comprises a second portion protruding from one of the first and second socket opening and is configured to be inserted into the second or first socket, respectively, via the other one of the first and second socket opening by relative movement of the first component towards the second component such that a top section of the second portion of the hollow holding member is passed by the inlet restriction under resilient deformation of the top section and/or the inlet restriction thereby achieving a connection between the first and second component. The threaded fastener is configured to extend through the hollow holding member from the second component to the threaded bore of the first socket of the first component for engagement with the threaded bore such that the connection between the first and second components is secured.

Hereby an assembly is provided facilitating installation. The hollow holding member is supported by one of the first or second component and comprises a second portion which is insertable into the socket of the other one of the first or second component such that the top section of the second portion of the hollow holding member is passed by the inlet restriction under resilient deformation of the top section and/or the inlet restriction. Hereby, the first and second component becomes releasable connected to each other, enabling an installer to perform different installation steps, such as attaching wires and the like, while the first and second component are releasable held together by means of the hollow holding member. Once the installation is completed, the first and second component may be secured in their assembled state by means of the threaded fastener.

By allowing the threaded fastener to extend through the hollow holding member from the second component to the threaded bore of the first socket of the first component for engagement with the threaded bore such that the connection between the first and second components is secured, it is ensured that the releasable connection of the first and second component and the subsequent securing of the connection may be achieved in a compact manner enabling efficient utilitazion of space.

The hollow holding member may be made of a resiliently deformable material. The hollow holding member may be made of a plastic material.

According to an embodiment, the top section of the second portion of the hollow holding member may have a shape tapering towards a distal end of the top section. Hereby insertion of the second portion into the first or second socket and movement of the top section past the inlet restriction may be facilitated.

According to another embodiment, the second portion of the hollow holding member may be provided with at least one slit extending in a longitudinal direction of the hollow holding member. The at least one slit in the second portion may provide the resilience required to ensure that the top section may be passed by the inlet restriction under resilient deformation of the top section.

According to another embodiment, the first portion of the hollow holding member may be releasably connected to the first or second component. To this end, the first portion of the hollow holding member may be provided with a protruding, resilient lug and a side surface of the first or second socket may be provided with a recess, wherein the hollow holding member may be releasably connected to the first or second component by means of the protruding, resilient lug being received by the recess. Alternatively, the first portion of the hollow holding member may be releasably connected to the first or second component by means of a threaded joint.

According to another embodiment, the first portion of the hollow holding member may be connected to the first or second component by means of an adhesive.

According to another embodiment, the first or second socket may be provided with an internal guide surface extending between the first or second socket opening, respectively, and the inlet restriction such that an inlet passage is formed having a shape tapering towards the inlet restriction. Hereby, insertion of the second portion into the second of first socket may be facilitated.

According to another embodiment, the assembly may further comprise an additional component which is connectable to the first component by means of the treaded fastener with the second component intermediately arranged between the additional component and the first component. By arranging the second component between the first component and the additional component, the second component may be clamped between the first component and the additional component by means of the threaded fastener.

According to another embodiment, the inlet restriction may be integrally formed with the first or second component.

According to another embodiment, the inlet restriction may be formed by a resilient member arranged in the first or second socket in proximity to the first or second socket opening, respectively. The resilient member may be formed as a separate piece. The resilient member may be a metal clip or an O-ring.

According to another embodiment, the first component may comprise a base provided with a pillar structure with a distal end, wherein the first socket may be provided in the pillar structure with the first socket opening open to the distal end.

According to another embodiment, the first component and/or the second component may be made of a plastic or a metallic material.

According to a second aspect of the present disclosure, a camera device is provided comprising an assembly in accordance with what has been described above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

DETAILED DESCRIPTION

Figure 1:
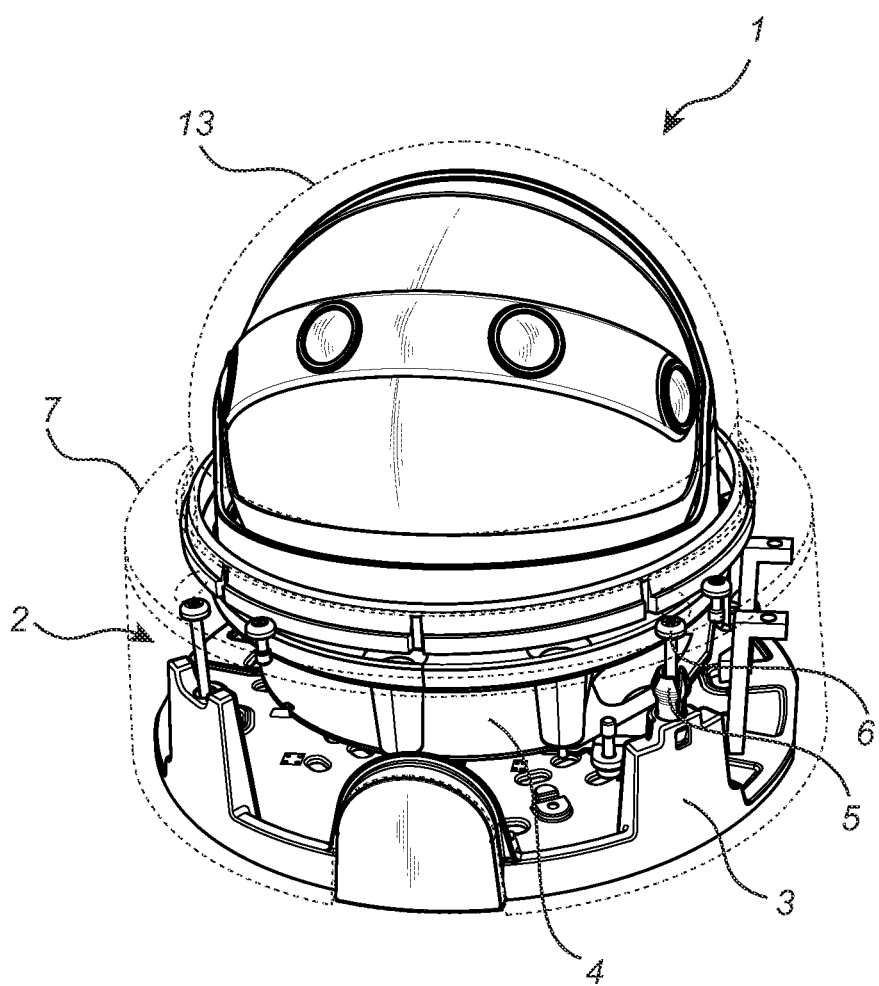
FIG. 1 is perspective view of a camera device provided with an assembly comprising a first component connected to a second component.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

The above, as well as additional objects, features and advantages of the present disclosure, will be better understood through the following illustrative and non-limiting detailed description of preferred embodiments of the present disclosure, with reference to the appended drawings, where the same reference numerals will be used for similar elements, wherein:

In FIG. 1 to which reference is made a camera device 1 is shown. The camera device 1 comprises an assembly 2 comprising a first component 3 and a second component 4 which are connected to each other by means of a hollow holding member (shown in FIG. 2) and a threaded fastener 6. The assembly may also, as illustrated in the shown embodiment, comprise an additional component 7 which is connected to the first component 3 with the second component 4 intermediately arranged between the additional component 7 and the first component 3.

The first component 3 has a first socket 8 with a first socket opening 9 and a threaded bore 10 extending from a bottom surface of the first socket 8. The second component 4 has a second socket 11 with a second socket opening 12, wherein the first socket opening 9 and the second socket opening 12 are configured to face each other when the first and second component 3, 4 are connected to each other. The first socket 8 and the second socket 11 will be described more in detail below with reference to FIG. 5.

In the shown embodiment, the first component 3 of the assembly 2 is a mount bracket and the second component 4 of the assembly 2 is camera unit. The mount bracket is configured for mounting on an installation surface. The camera unit comprises a camera body. The shown embodiment further comprises the additional component 7 in the form of a dome ring which is connected to the mount bracket with the camera unit arranged intermediately between the dome ring and the mount bracket.

The camera device 1 may further comprise a dome window 13 which is attached to the assembly 2 by means of the dome ring.

In the shown embodiment in FIG. 1, the dome ring and an external collar of the camera unit are made transparent in order to better illustrate the structure of the camera device 1.

As mentioned above, the first component 3 and the second component 4 are connectible to each other by means of the hollow holding member 5 and the threaded fastener 6. More specifically, one of the first socket 8 and the second socket 11 is provided with an inlet restriction 14 and the hollow holding member 5 comprises a first portion 15, FIG. 3, arranged in the other one of the first socket 8 and the second socket 11 and connected to the associated first or second component 3, 4, wherein the hollow holding member 5 comprises a second portion 16 protruding from one of the first and second socket opening 9, 12 and configured to be inserted into the second or first socket 11, 8, respectively, via the other one of the first and second socket opening 9, 12 by relative movement of the first component 3 towards the second component 4 such that a top section 17 of the second portion 16 of the hollow holding member 5 is passed by the inlet restriction 14 under resilient deformation of the top section 17 and/or the inlet restriction 14 thereby achieving a connection between the first and second component 3, 4, which will be explained more in detail below.

The threaded fastener 6 is configured to extend through the hollow holding member 5 from the second component 4 to the threaded bore 10 of the first socket 8 of the first component 3 for engagement with the threaded bore 10 such that the connection between the first and second components 3, 4 is secured.

Figure 2:
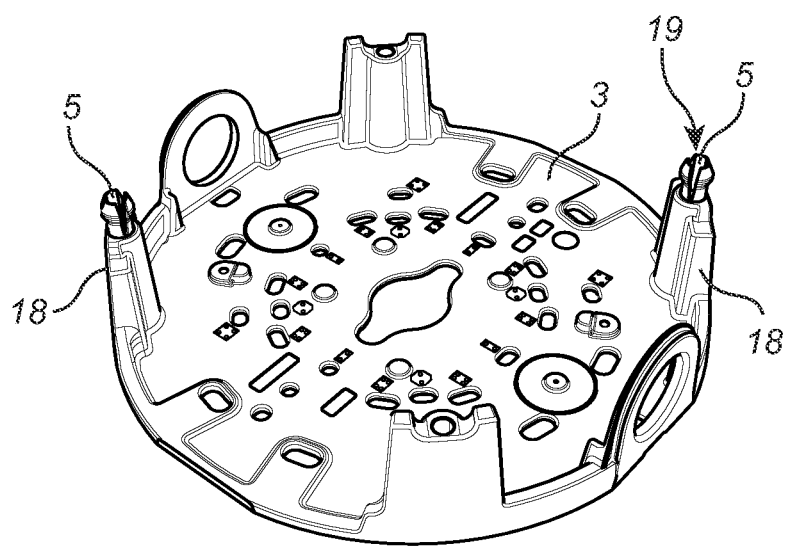
FIG. 2 is a perspective view of a first component in the form of a mount bracket of a camera device.

In FIG. 2, to which reference now is made, the first component 3 in the form of a mount bracket is illustrated.

In the shown embodiment, the first component 3 forms a base provided with four pillar structures 18 circumferentially distributed along the peripheral portion of the first component 3. Each pillar structure 3 may be provided with a first socket 8 of the type as described above.

Each pillar structure 18 has a distal end 19, wherein the first socket 8 is provided in the pillar structure 18 with the first socket opening 9 open to the distal end 19.

In the shown embodiment, two of the pillar structures 18 are associated with a hollow holding member 5.

Each hollow holding member 5 comprises as described above, a first portion 15 and a second portion 16. In the shown embodiment, the first portion 15 of each hollow holding member 5 is arranged in an associated first socket 8 and connected to the first component 3 while the second portion 16 protrudes from the first socket opening 9.

Figure 3:
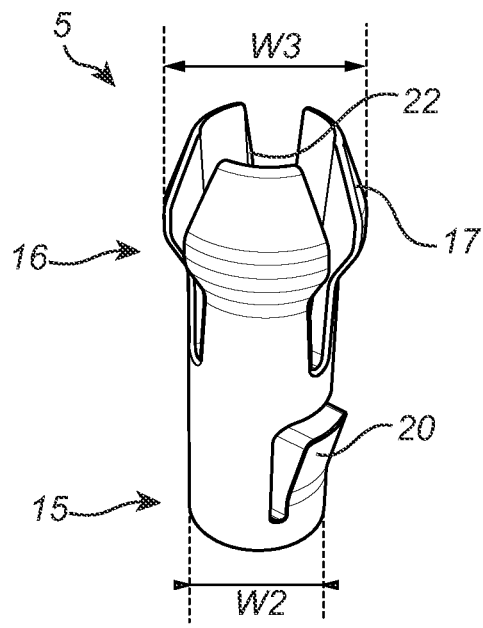
FIG. 3 is a perspective view of a hollow holding member of the assembly.
Figure 4:
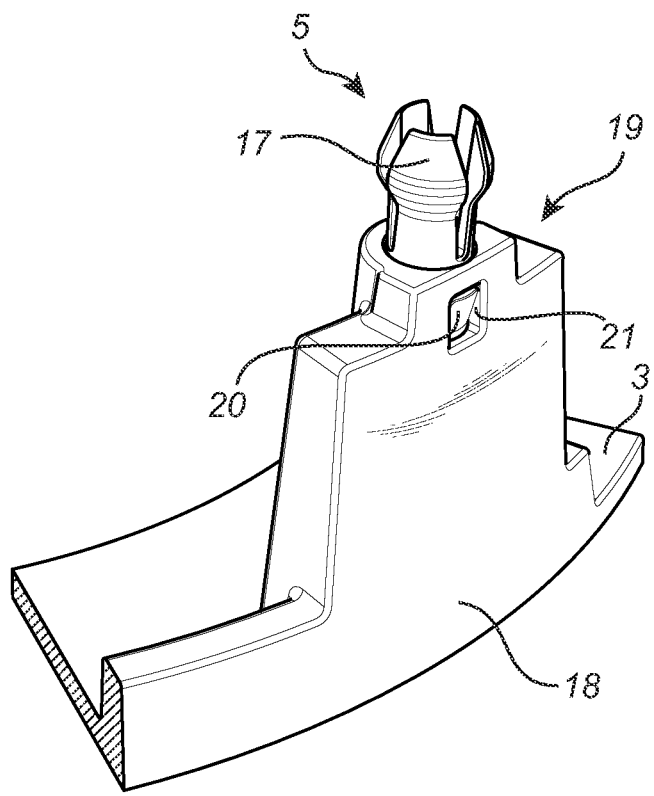
FIG. 4 is perspective view of a part of the first component shown in FIG. 2 provided with a hollow holding member supported by a first socket of the first component.

The hollow holding member 5 and a pillar structure 18 provided with a first socket 8 accommodating the first portion 15 of the holding member 5 is shown in detail in FIGS. 3 and 4, to which reference now also is made.

The hollow holding member 5 may be made of a plastic material.

In the shown embodiment, the hollow holding member 5 comprises a cylindrical body defining a channel extending in the longitudinal direction of the holding member 5.

The lower part of the cylindrical body forms the first portion 15 of the holding member 5.

In the shown embodiment, a protrusion in the form of a resilient lug 20 is arranged on the first portion 15 projecting from the envelope surface of the body. The lug 20 is displaceable in a radial direction such that the first portion 15 of the holding member 5 may be inserted into the first socket 8. As shown in FIG. 4, a side surface of the first socket 8 may be provided with a recess 21 configured to receive the lug 20 when the first portion of the hollow holding member 5 is inserted into the first socket 8 such that the hollow holding member 5 may be releasable connected to the first component 3.

The upper part of the cylindrical body forms the second portion 16 of the hollow holding member 5. In the shown embodiment, the second portion comprises a top section 17 in the shape of a bulb. The bulb is tapering towards a distal end of the top section 17.

The hollow holding member 5 may be provided with at least one slit 22 extending in the longitudinal direction of the hollow holding member 5. In the shown embodiment, the hollow holding member 5 is provided with three slits 22.

The top section 17 of the second portion 16 of the hollow holding member 5 is configured such that it may, as explained above, be passed by the inlet restriction 14 under resilient deformation. In the shown embodiment, the resilient deformation is enabled by means of the slits 22.

Figure 5:
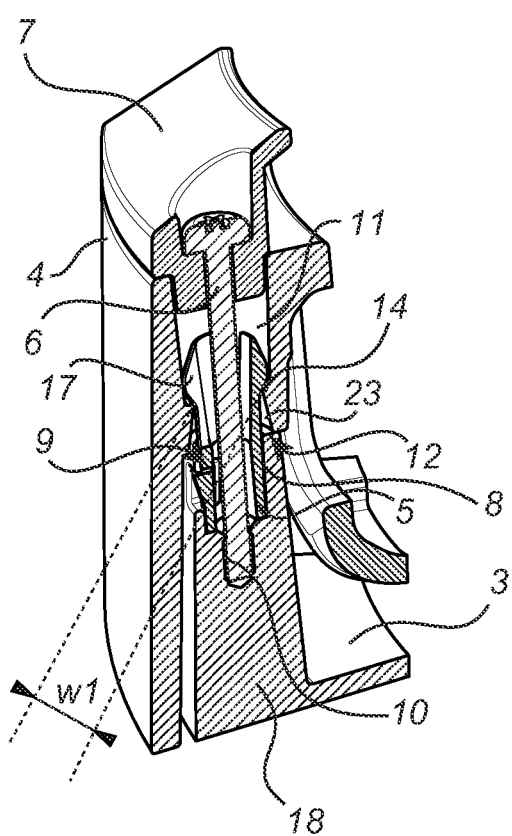
FIG. 5 is a perspective view illustrating a cross section of the assembly in an assembled state.

In FIG. 5, a cross sectional view is shown illustrating the assembly 2 of the type described above in an assembled state.

As evident from the figure, the first component 3 and the second component 4 are connected to each other by means of the hollow holding member 5 and the connection is secured by means of the threaded fastener 6.

The first and the second components 3, 4 are such arranged that the first socket opening 9 of the first socket faces 8 the second socket opening 12 of the second socket 11.

The first portion 15 of the hollow holding member 5 is arranged in the first socket 8 and is releasably connected to the first component 3 by means of the resilient lug 20 received by the recess of 21 the first socket 8.

The second portion 16 of the hollow holding member 5 protrudes from the first socket 8 and has been received by the second socket 11 via the second socket opening 12.

In the shown embodiment, the inlet restriction 14 of the second socket 11 is integrally formed with the second component 4. The inlet restriction 14 is arranged at a distance from the second socket opening 12 and the second socket 11 is provided with an internal guide surface 23 extending between the second socket opening 12 and the inlet restriction 14 such that an inlet passage is formed having a shape tapering towards the inlet restriction 14.

The inlet restriction 14 has a width W1 essentially corresponding to a width W2 of the body of the hollow holding member 5. The top section 17 of the second portion 16 of the hollow holding member 5 has a width W3 which is greater than the width W1 of the inlet restriction 14.

The top section 17 of the second portion 16 of the hollow holding member 5 has in the shown assembled state been passed by the inlet restriction 14 by relative movement of the first component 3 towards the second component 4. The top section 17 is as explained above configured for resilient deformation when passed by the inlet restriction 14. The internal guide surface of 23 the second socket 11 and the tapering shape of the top section 17 formed as a bulb will facilitate the resilient deformation. Once the top section 17 has passed the inlet restriction14, the top section will resume its original shape, thereby releasable connecting the first and second components 3, 4.

Consequently, when performing an installation comprising an assembly 2 as described above, the first and second components 2, 3 may be releasable connected to each other by means of the hollow holding member 5. Thus, the hollow holding member enables a simple and sufficiently reliable connection of the first and second component 3, 4 during installation. When the installation is completed, the connection may be secured by means of the threaded fastener 6.

In FIG. 5 a threaded fastener 6 in the form a screw is illustrated securing the connection of the first and second component 3, 4. The threaded fastener 6 extends through the hollow holding member 5 from the second socket 11 to the threaded bore 10 of the first socket 8 for engagement therewith.

In the shown embodiment, the assembly 2 further comprises an additional component 7 in the form of a dome ring, wherein the second component 4 is arranged between the first component 3 and the additional component 7, and the threaded fastener 6 extends from the additional component 7 such that the additional component 7, the second component 4 and the first component 3 are secured in the assembled state.

Figure 6:
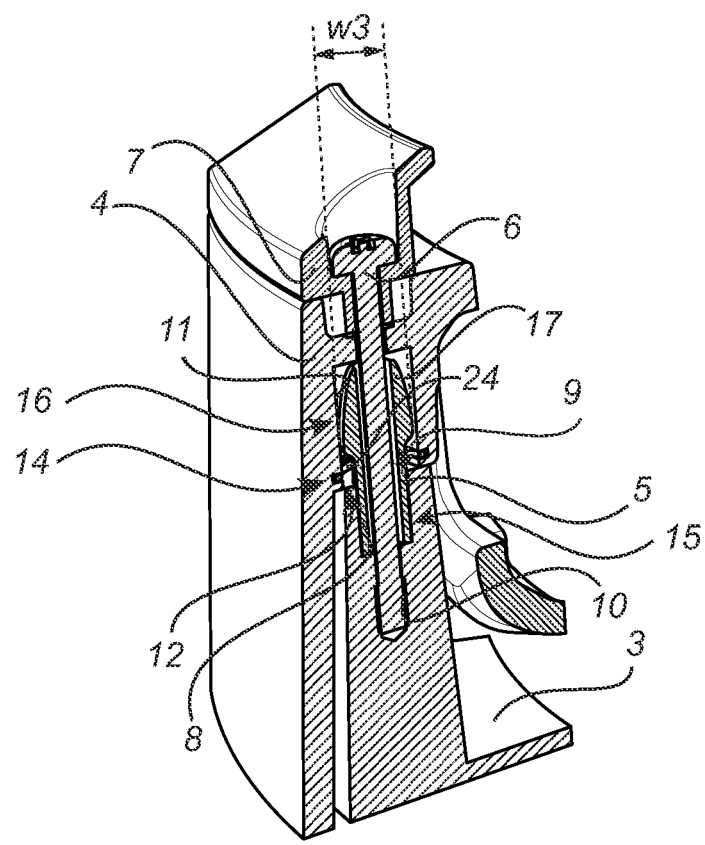
FIG. 6 is a perspective view illustrating a cross section of an alternative embodiment of the assembly in an assembled state.

In FIG. 6, an alternative embodiment of an assembly 2 for a camera device 1 is shown, comprising a first component 3 in the form of a mount bracket, a second component 4 in the form of a camera unit and an additional component 7 in the form of a dome ring. In the assembled state of the assembly 2, the dome ring is connected to the mount bracket by means of a threaded fastener 6 with the camera unit arranged therebetween. The first component 3 and the second component 4 are releasable connected to each other by means of a hollow holding member 5, wherein the threaded fastener 6 extends through the hollow holding member 5 from the additional component 7 to the first component 3 via the second component 4.

In the shown embodiment, the hollow holding member 5 comprises a cylindrical body provided with a top section 17 formed as a bulb.

A lower part of the cylindrical body forms the first portion 15 of the holding member 5, which first portion 15 is arranged in the first socket 8 of the first component 3 and connected to the first component 3 by means of an adhesive. Alternatively, the first portion may be connected to the first component by means of a thread.

Figure 7:
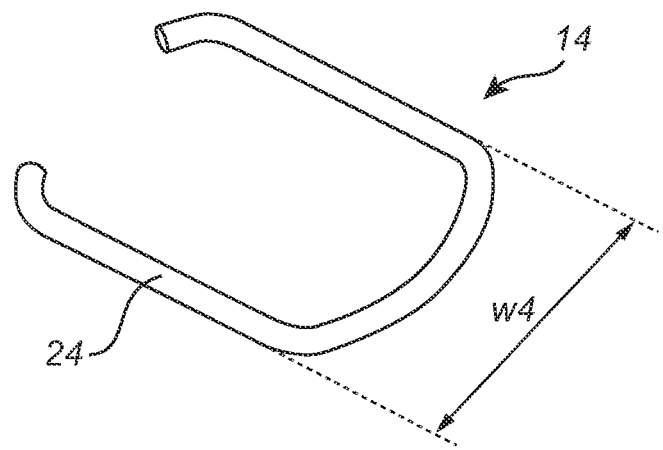
FIG. 7 is a perspective view of an alternative embodiment of the resilient member.

The second portion 16 of the hollow holding member 5 protrudes from the first socket opening 9 and extend into the second socket 11 of the second component 4. The top section 17 of the second portion 16 has been passed by an inlet restriction 14 of the second socket 11, which inlet restriction 14 is formed by a resilient member 24 arranged in the second socket 11 in proximity to the second socket opening 12. In the embodiment shown in FIG. 6, the resilient member 24 is a clip made of for instance string steel. The clip, which is shown in detail in FIG. 7 defines a width W4 which is smaller than a width W3 of the top section 17 of the hollow holding member 5. The clip is configured for resilient deformation in response to the top section 17 being passed by the inlet restriction 14 by means of relative movement of the first component 3 towards the second component 4. When the top section 17 has been passed by the inlet restriction 14, the clip will resume its original form thereby releasably connect the second component 4 to the first component 3.

Figure 8:
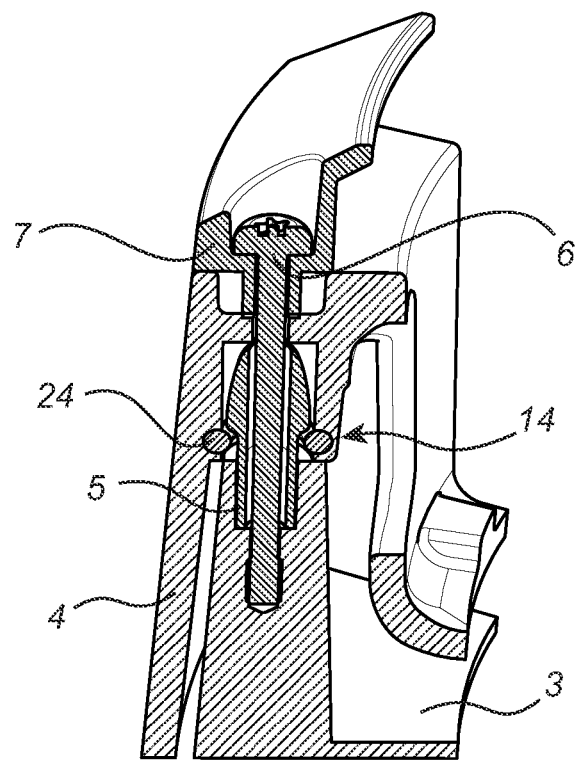
FIG. 8 is a perspective view illustrating a cross section of yet another embodiment of the assembly in an assembled state.

Alternatively, the resilient member 24 may be formed by an O-ring as shown in FIG. 8.

In the embodiments described above, the first portion of the hollow holding member is disclosed as being arranged in the first socket and connected to the first component. Further the second portion of the hollow holding member is disclosed as protruding from the first socket and inserted into the second socket via the second socket opening such that the top section is passed by the inlet restriction of the second socket under resilient deformation of the top section or the inlet restriction. However, it is understood that it is equally possible to arrange the first portion of the hollow holding member in the second socket and connecting it to the second component while the second portion of the hollow holding member protrudes from the second socket. In this case, the inlet restriction may be arranged in the first socket such that the second portion of the hollow holding member is insertable into the first socket via the first socket opening. Hereby the top section of the hollow holding member may be passed by the inlet restriction arranged in the first socket under resilient deformation of the top section and/or the inlet restriction for achieving the connection between the first and second component.

It will be appreciated that the present disclosure is not limited to the embodiments shown. Several modifications and variations are thus conceivable within the scope of the disclosure which thus is exclusively defined by the appended claims.

The invention claimed is:

1. An assembly comprising a first component, a second component, a hollow holding member and a threaded fastener,
   wherein the first component is connectable to the second component by means of the hollow holding member and the threaded fastener,
   the first component having a first socket with a first socket opening and a threaded bore extending from a bottom surface of the first socket,
   the second component having a second socket with a second socket opening,
   wherein the first socket opening and the second socket opening are configured to face each other when the first and second component are connected to each other,
   wherein one of the first socket and the second socket is provided with an inlet restriction,
   wherein the hollow holding member comprises a first portion arranged in the other one of the first socket and the second socket and connected to the associated first or second component,
   wherein the hollow holding member comprises a second portion protruding from one of the first and second socket opening and configured to be inserted into the second or first socket, respectively, via the other one of the first and second socket opening by relative movement of the first component towards the second component such that a top section of the second portion of the hollow holding member is passed by the inlet restriction under resilient deformation of the top section thereby achieving a connection between the first and second component, and
   wherein the threaded fastener is configured to extend through the hollow holding member from the second component to the threaded bore of the first socket of the first component for engagement with the threaded bore such that the connection between the first and second components is secured.

2. The assembly according to claim 1, wherein the top section of the second portion of the hollow holding member has a shape tapering towards a distal end of the top section.

3. The assembly according to claim 1, wherein the second portion of the hollow holding member is provided with at least one slit extending in a longitudinal direction of the hollow holding member.

4. The assembly according to claim 1, wherein the first portion of the hollow holding member is releasably connected to the first or second component.

5. The assembly according to claim 4, in which the first portion of the hollow holding member is provided with a protruding, resilient lug and in which a side surface of the first or second socket is provided with a recess, wherein the hollow holding member is releasably connected to the first or second component by means of the protruding, resilient lug being received by the recess.

6. The assembly according to claim 4, wherein the first portion of the hollow holding member is releasably connected to the first or second component by means of a threaded joint.

7. The assembly according to claim 1, wherein the first portion of the hollow holding member is connected to the first or second component by means of an adhesive.

8. The assembly according to claim 1, wherein the first or second socket is provided with an internal guide surface extending between the first or second socket opening, respectively, and the inlet restriction such that an inlet passage is formed having a shape tapering towards the inlet restriction.

9. The assembly according to claim 1, further comprising an additional component which is connectable to the first component by means of the treaded fastener with the second component intermediately arranged between the additional component and the first component.

10. The assembly according to claim 1, wherein the inlet restriction is integrally formed with the first or second component.

11. The assembly according to claim 1, wherein the inlet restriction is formed by a resilient member arranged in the first or second socket in proximity to the first or second socket opening, respectively.

12. The assembly according to claim 11, wherein the resilient member is a metal clip or an O-ring.

13. The assembly according to claim 1, in which the first component comprises a base provided with a pillar structure with a distal end, wherein the first socket is provided in the pillar structure with the first socket opening open to the distal end.

14. The assembly according to claim 1, wherein the first component and/or the second component is made of a plastic or a metallic material.

15. A camera device comprising an assembly in accordance with claim 1.

16. An assembly comprising a first component, a second component, a hollow holding member and a threaded fastener,
   wherein the first component is connectable to the second component by means of the hollow holding member and the threaded fastener,
   the first component having a first socket with a first socket opening and a threaded bore extending from a bottom surface of the first socket,
   the second component having a second socket with a second socket opening,
   wherein the first socket opening and the second socket opening are configured to face each other when the first and second component are connected to each other,
   wherein one of the first socket and the second socket is provided with an inlet restriction,
   wherein the hollow holding member comprises a first portion arranged in the other one of the first socket and the second socket and connected to the associated first or second component,
   wherein the hollow holding member comprises a second portion protruding from one of the first and second socket opening and configured to be inserted into the second or first socket, respectively, via the other one of the first and second socket opening by relative movement of the first component towards the second component such that a top section of the second portion of the hollow holding member is passed by the inlet restriction under resilient deformation of the inlet restriction thereby achieving a connection between the first and second component, and
   wherein the threaded fastener is configured to extend through the hollow holding member from the second component to the threaded bore of the first socket of the first component for engagement with the threaded bore such that the connection between the first and second components is secured.

17. An assembly comprising a first component, a second component, a hollow holding member and a threaded fastener,
   wherein the first component is connectable to the second component by means of the hollow holding member and the threaded fastener,
   the first component having a first socket with a first socket opening and a threaded bore extending from a bottom surface of the first socket,
   the second component having a second socket with a second socket opening,
   wherein the first socket opening and the second socket opening are configured to face each other when the first and second component are connected to each other,
   wherein one of the first socket and the second socket is provided with an inlet restriction,
   wherein the hollow holding member comprises a first portion arranged in the other one of the first socket and the second socket and connected to the associated first or second component,
   wherein the hollow holding member comprises a second portion protruding from one of the first and second socket opening and configured to be inserted into the second or first socket, respectively, via the other one of the first and second socket opening by relative movement of the first component towards the second component such that a top section of the second portion of the hollow holding member is passed by the inlet restriction under resilient deformation of both the top section and the inlet restriction thereby achieving a connection between the first and second component, and
   wherein the threaded fastener is configured to extend through the hollow holding member from the second component to the threaded bore of the first socket of the first component for engagement with the threaded bore such that the connection between the first and second components is secured.

* * * * *